US010219308B1

(12) United States Patent
Sevindik (10) Patent No.: US 10,219,308 B1
(45) Date of Patent: Feb. 26, 2019

(54) SYSTEMS AND METHODS FOR CONFIGURING DEVICE TO DEVICE COMMUNICATION USING A PLURALITY OF TRANSMISSION DEVICES

(71) Applicant: Sprint Spectrum LP, Overland Park, KS (US)

(72) Inventor: Volkan Sevindik, Fairfax, VA (US)

(73) Assignee: Sprint Spectrum L.P., Overland Park, KS (US)

( * ) Notice: Subject to any disclaimer, the term of this patent is extended or adjusted under 35 U.S.C. 154(b) by 341 days.

(21) Appl. No.: 14/742,931

(22) Filed: Jun. 18, 2015

(51) Int. Cl.
*H04B 7/00* (2006.01)
*H04W 76/14* (2018.01)
*H04W 8/22* (2009.01)

(52) U.S. Cl.
CPC ............ *H04W 76/14* (2018.02); *H04W 8/22* (2013.01)

(58) Field of Classification Search
CPC ..... H04W 40/02; H04W 40/04; H04W 40/20; H04W 40/22; H04W 40/24
USPC .................. 370/310, 328, 349, 389
See application file for complete search history.

(56) References Cited

U.S. PATENT DOCUMENTS

| 2014/0056220 | A1* | 2/2014 | Poitau | H04W 40/246 370/328 |
| 2015/0029866 | A1* | 1/2015 | Liao | H04W 4/008 370/241 |
| 2015/0045044 | A1* | 2/2015 | Liu | H04W 4/005 455/450 |
| 2015/0215903 | A1* | 7/2015 | Zhao | H04W 72/04 370/329 |
| 2015/0334555 | A1* | 11/2015 | Seo | H04W 84/18 370/254 |
| 2016/0066336 | A1* | 3/2016 | Sevindik | H04W 72/10 370/315 |
| 2016/0157254 | A1* | 6/2016 | Novlan | H04W 48/00 370/329 |
| 2016/0285539 | A1* | 9/2016 | Sadiq | H04W 8/005 |

* cited by examiner

Primary Examiner — Dmitry Levitan (57) ABSTRACT

Systems and methods are described for configuring device to device communication using a plurality of transmission devices. Application requirements may be retrieved for a recipient wireless device, at a source wireless device, wherein the source wireless device transmits data to the recipient wireless device using a device to device transmission. A device to device transmission configuration based on the retrieved application requirement may be determined. Data associated with the recipient wireless device may be transmitted to a number of wireless devices based on the determined configuration such that the number of wireless devices transmit the data to the recipient wireless device as device to device transmissions.

14 Claims, 6 Drawing Sheets

SYSTEMS AND METHODS FOR CONFIGURING DEVICE TO DEVICE COMMUNICATION USING A PLURALITY OF TRANSMISSION DEVICES

TECHNICAL BACKGROUND

Telecommunication systems, such as cellular networks or other wireless networks, use various network links throughout the network to communicate. While many transmissions occur between a wireless device and an access node, communications between wireless devices may also be leveraged. In certain circumstances, it may be useful to bolster the received signal level of a signal received at a wireless device from a device to device transmission. Accordingly, a system that effectively enhances device to device transmissions and considers utilization of system resources may provide an efficient service to users.

OVERVIEW

Systems and methods are described for configuring device to device communication using a plurality of transmission devices. Application requirements may be retrieved for a recipient wireless device, at a source wireless device, wherein the source wireless device transmits data to the recipient wireless device using a device to device transmission. A device to device transmission configuration based on the retrieved application requirement may be determined. Data associated with the recipient wireless device may be transmitted to a number of wireless devices based on the determined configuration such that the number of wireless devices transmit the data to the recipient wireless device as device to device transmissions.

DETAILED DESCRIPTION

In an embodiment, a device to device (D2D) communication may be configured by determining a number of transmission devices for the communication. For example, application requirements for a recipient wireless device may be retrieved, and based on the application requirements, a number of transmission devices may be determined. The data to be transmitted to the recipient wireless device may be sent to the number of wireless devices based on the determined configuration. The number of wireless devices and the source wireless device may then transmit the data to the recipient wireless device as device to device transmissions. The increased spatial multiplexing derived from the number of wireless devices may increase the received signal level (e.g., SINR level) at the recipient wireless device.

Figure 1:
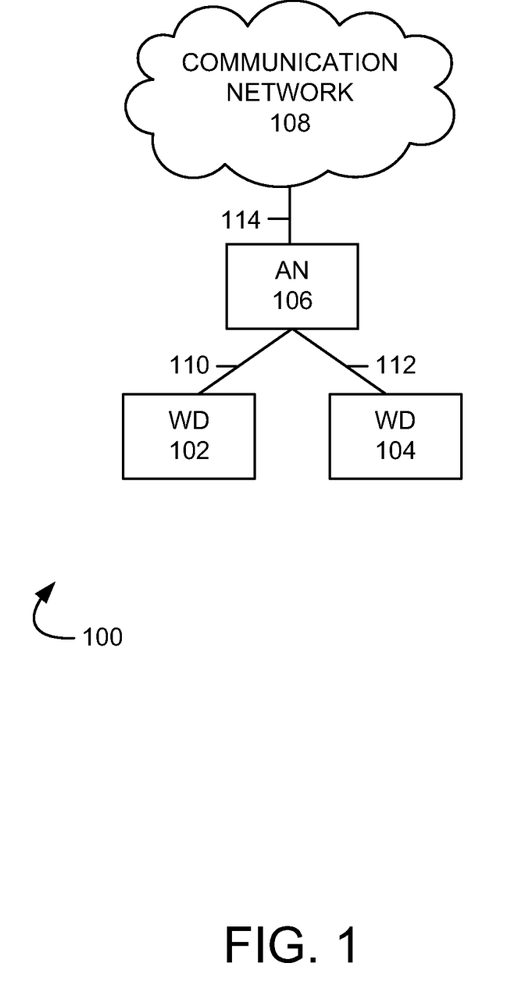
FIG. 1 illustrates an exemplary communication system to configure device to device communication using a plurality of transmission devices.

FIG. 1 illustrates an exemplary communication system 100 to configure device to device communication using a plurality of transmission devices comprising wireless devices 102 and 104, access node 106, communication network 108, and communication links 110, 112, and 114. Other network elements may be present in the communication system 100 to facilitate communication but are omitted for clarity, such as controller nodes, base stations, base station controllers, gateways, mobile switching centers, dispatch application processors, and location registers such as a home location register or visitor location register. Furthermore, other network elements may be present to facilitate communication between access node 104 and communication network 108 which are omitted for clarity, including additional processing nodes, routers, gateways, and physical and/or wireless data links for carrying data among the various network elements.

Wireless devices 102 and 104 can be any device configured to communicate over communication system 100 using a wireless communication link. For example, wireless devices 102 and 104 can include a cell phone, a smart phone, a computing platform such as a laptop, palmtop, or a tablet, a personal digital assistant, or an internet access device, and combinations thereof. It is noted that while two wireless devices are illustrated in FIG. 1 as being in communication with access node 106, any number of wireless devices can be implemented.

Access node 106 is a network node capable of providing wireless communications to wireless devices 102 and 104, and can be, for example, a base transceiver station, a radio base station, and an eNodeB device. Access node 106 may communicate with communication network 108 over communication link 114. Although only access node 106 is illustrated in FIG. 1, wireless devices 102 and 104 (and other wireless devices not depicted) can be in communication with a plurality of access nodes and/or small cells. The plurality of access nodes and/or small cells can be associated with different networks and can support different communication protocols and radio access technologies.

Communication network 108 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 108 can be capable of carrying voice information and other information, for example, to support communications by a wireless device such as wireless device 102. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 108 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 108 may also comprise a wireless network, including base stations, wireless communication nodes, telephony switches, internet routers, network gateways, computer systems, communication links, or some other type of communication equipment, and combinations thereof.

Communication links 110, 112, and 114 can be wired or wireless communication links. Wired communication links can comprise, for example, twisted pair cable, coaxial cable or fiber optic cable, or combinations thereof. Wireless communication links can comprise a radio frequency, microwave, infrared, or other similar signal, and can use a suitable communication protocol, for example, GSM, CDMA, UMTS, HSPA, EV-DO, or 3GPP LTE, or combinations thereof. Other wireless protocols can also be used.

Figure 2:
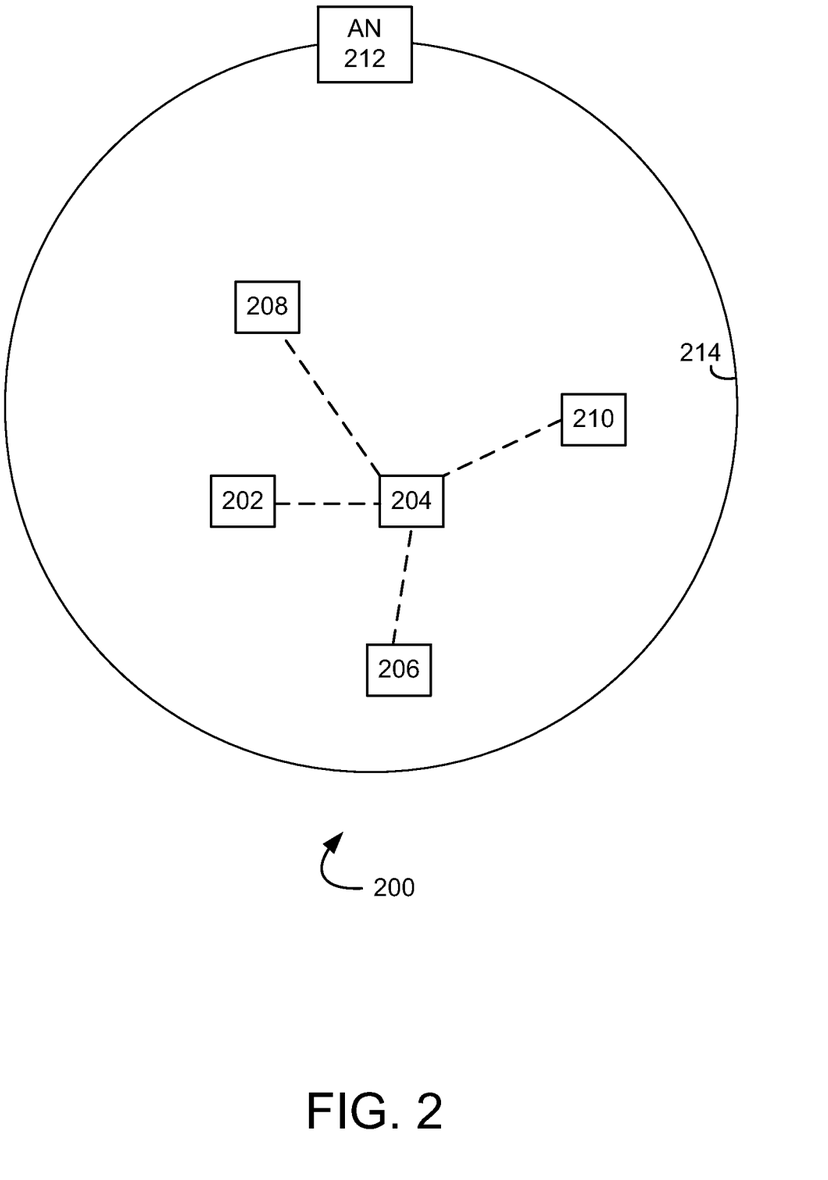
FIG. 2 illustrates another exemplary communication system to configure device to device communication using a plurality of transmission devices.

FIG. 2 illustrates an exemplary communication system 200 for configuring device to device communication using a plurality of transmission devices. System 200 comprises wireless devices 202, 204, 206, 208, and 210, access node 212, and signal area 214. Wireless devices 202, 204, 206, 208, and 210 may comprise wireless devices similar to wireless device 102 and access node 212 may comprise an access node similar to access node 106.

In an embodiment, system 200 may use a plurality of carriers in order to provide wireless communication services. A plurality of carriers that comprise bandwidth for wireless communications (e.g., 2.5 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers.

In an embodiment, a signal area may comprise an area around an access node where a wireless device may detect wireless signals transmitted from the access node (e.g., a references signal) at a signal level above a threshold. In this example, access node 212 may comprise signal area 214 such that the access node may transmit signals over the signal area using one or more particular band classes (BCs). A band class may comprise a block of wireless spectrum. In an embodiment, a frequency band may comprise a band class. Examples of such band classes may be blocks of spectrum at 800 MHz, 1,900 MHz, and 2,500 MHz In operation, access node 212 may establish communication with wireless devices 202, 204, 206, 208, and 210 such that access node 212 provides the wireless device access to a communication network (e.g., communication network 108). Access node 212 may schedule transmissions (e.g., physical resource block transmissions) to wireless devices in communication with the access node. For example, a packet may be received at access node 212 that is associated with wireless device 202, and access node 212 may schedule transmissions to wireless device 202 to communicate the data from the received packet.

In an embodiment, wireless devices may use device to device (D2D) communication in order to communicate data between the devices (e.g., without using the access node). For example, wireless devices 202 and 204 may comprise a D2D communication group such that the wireless devices communicate data. In an embodiment, a D2D communication group may communicate data over one or more frequency bands using a communication protocol similar to the protocol used by access node 212. One of wireless device 202 and 204 may transmit data to the other wireless device using an antenna. In an embodiment, wireless devices 202 and 204 may communicate data using wireless resources that are used by access node 212 when communicating with wireless devices over signal area 214. In this example, the wireless resources used by the D2D communication group are shared with access node 212, and thus do not comprise dedicated wireless resources. In another embodiment, the wireless devices may communicate using dedicated wireless resources (e.g., not shared with access node 212). The D2D communication group may comprise a plurality of wireless devices (e.g., greater than two).

In an embodiment, when wireless device 202 transmits data to wireless device 204, the received signal level at wireless device 204 may be low (e.g., below a threshold signal level) due to limited transmissions sources (e.g., lack of spatial multiplexing). Accordingly, a system that may increase the spatial multiplexing of a signal being transmitted during a device to device communication may be able to provide enhanced wireless services.

Figure 3:
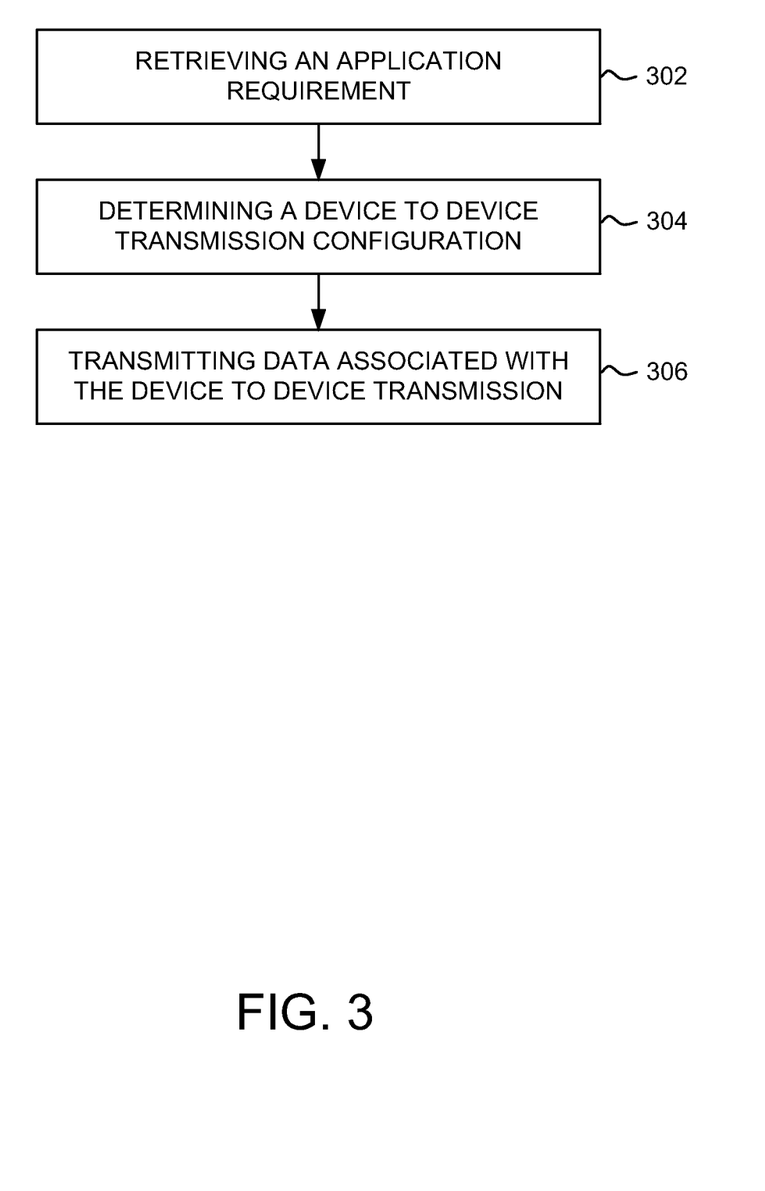
FIG. 3 illustrates an exemplary method for configuring device to device communication using a plurality of transmission devices.

FIG. 3 illustrates an exemplary method for configuring device to device communication using a plurality of transmission devices. The method will be discussed with reference to the exemplary communication system 200 illustrated in FIG. 2, however, the method can be implemented with any suitable communication system.

Referring to FIG. 3, at step 302, application requirements may be retrieved for a recipient wireless device, at a source wireless device, wherein the source wireless device transmits data to the recipient wireless device using a device to device transmission. For example, wireless device 202 may transmit data to wireless device 204 as a device to device (D2D) communication. The application requirements for the transmission to wireless device 204 may be retrieved at wireless device 202.

At step 304, a device to device transmission configuration based on the retrieved application requirement may be determined. For example, a configuration for the device to device communication from wireless device 202 to wireless device 204 may be determined. In an embodiment, the determined configuration may comprise a number of repeater wireless devices for the device to device communication.

At step 306, data associated with the recipient wireless device may be transmitted to a number of wireless devices based on the determined configuration such that the number of wireless devices transmit the data to the recipient wireless device as device to device transmissions. For example, based on the configuration determined for the device to device communication, wireless device 202 may transmit data associated with wireless device 204 to a number of wireless devices. The number of wireless devices may comprise wireless device 206, 208, and 210. In an embodiment, wireless devices 202, 206, 208, and 210 may then transmit the data associated with wireless device 202 to wireless device 204 in a device to device communication. Here, the device to device transmission may comprise increased spatial multiplexing since wireless devices 206, 208, and 210 are additional signal sources for the transmission.

Figure 4:
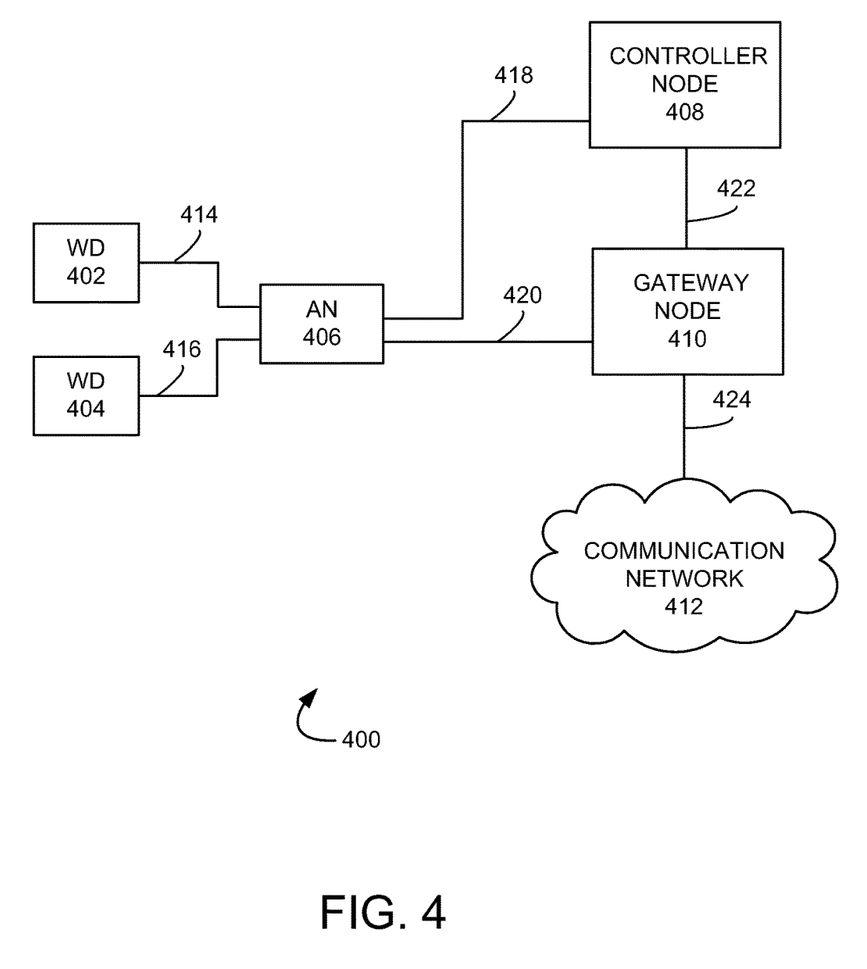
FIG. 4 illustrates another exemplary system to configure device to device communication using a plurality of transmission devices.

FIG. 4 illustrates another exemplary communication system 400 for configuring device to device communication using a plurality of transmission devices. Communication system 400 may comprise wireless devices 402 and 404, access node 406, controller node 408, gateway node 410, communication network 412, and communication links 416, 418, 420, 422, and 424. Other network elements may be present in the communication system 400 to facilitate communication but are omitted for clarity, such as base stations, base station controllers, gateways, mobile switching centers, dispatch application processors, and location registers such as a home location register or visitor location register.

Wireless devices 402 and 404 can be any devices configured to communicate over communication system 400 using a wireless communication link. For example, wireless devices 402 and 404 can include a cell phone, a smart phone, a computing platform such as a laptop, palmtop, or a tablet, a personal digital assistant, or an internet access device, and combinations thereof.

Access node 406 is a network node capable of providing wireless communications to wireless devices 402 and 404, and can be, for example, a base transceiver station, a radio base station, or an eNodeB device. In an embodiment, access node 406 can comprise a serving access node for wireless devices 402 and 404. Access node 406 may communicate with controller node 408 over communication link 418 and with gateway node 410 over communication links 420.

Controller node 408 can be any network node configured to manage services within system 400. Controller node 408 may provide other control and management functions for system 400. The controller node 408 can be a single device having various functions or a plurality of devices having differing functions. For example, controller node 408 can include at least one of a multi-cell/multicast coordination entity (MCE), a mobility management entity (MME), a mobile switching center (MSC), a radio network controller (RNC), and a combination thereof.

Controller node 408 can comprise a processor and associated circuitry to execute or direct the execution of computer-readable instructions to obtain information. Controller node 408 can retrieve and execute software from storage, which can include a disk drive, a flash drive, memory circuitry, or some other memory device, and which can be local or remotely accessible. The software may comprise computer programs, firmware, or some other form of machine-readable instructions, and may include an operating system, utilities, drivers, network interfaces, applications, or some other type of software, including combinations thereof. Controller node 408 can receive instructions and other input at a user interface. Controller node 408 can comprise a processor and associated circuitry to execute or direct the execution of computer-readable instructions to obtain information.

Gateway node 410 is a network element which can comprise a processor and associated circuitry to execute or direct the execution of computer-readable instructions. Gateway node 410 may retrieve and execute software from storage, which can include a disk drive, flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. In an embodiment, gateway node 410 can provide instructions to access node 406 related to channel selection in communications with wireless devices 402 and 404. For example, gateway node 410 can comprise at least one of a serving gateway (SGW), a packet data network gateway (PDNGW), a cellular gateway (CGW), and a combination thereof.

Communication network 412 can be a wired and/or wireless communication network, and can comprise processing nodes, routers, gateways, and physical and/or wireless data links for carrying data among various network elements, including combinations thereof, and can include a local area network, a wide area network, and an internetwork (including the Internet). Communication network 412 may also comprise base stations, wireless communication nodes, telephony switches, internet routers, network gateways, computer systems, communication links, or some other type of communication equipment, and combinations thereof. Wireless network protocols may comprise code division multiple access (CDMA) 1xRTT, Global System for Mobile communications (GSM), Universal Mobile Telecommunications System (UMTS), High-Speed Packet Access (HSPA), Evolution Data Optimized (EV-DO), EV-DO rev. A, and Third Generation Partnership Project Long Term Evolution (3GPP LTE). Wired network protocols that may be utilized by communication network 412 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM).

Communication links 414, 416, 418, 420, 422, and 424 can be wired or wireless communication links. Wired communication links can be, for example, twisted pair cable, coaxial cable or fiber optic cable, or combinations thereof. Wireless communication links can be a radio frequency, microwave, infrared, or other similar signal, and can use a suitable communication protocol, for example, Global System for Mobile telecommunications (GSM), Code Division Multiple Access (CDMA), or Long Term Evolution (LTE), or combinations thereof. Other wireless protocols can also be used.

Other network elements may be present in the communication system 400 to facilitate wireless communication but are omitted for clarity, such as base stations, base station controllers, gateways, mobile switching centers, dispatch application processors, and location registers such as a home location register or visitor location register. Furthermore, other network elements may be present to facilitate communication among access node 406, controller node 408, gateway node 410, and communication network 412 which are omitted for clarity, including additional processing nodes, routers, gateways, and physical and/or wireless data links for carrying data among the various network elements.

In an embodiment, system 400 may use a plurality of carriers in order to provide wireless communication services. A plurality of carriers that comprise bandwidth for wireless communications (e.g., 2.5 GHz carrier, 1900 Mhz carrier, and 800 Mhz carrier, and the like) may include a plurality of channels (e.g., 5 Mhz channels, 10 Mhz channels, 15 Mhz channels, and the like) that may further be divided into subcarriers.

In operation, access node 406 may establish communication with wireless devices 402 and 404 such that access node 406 provides the wireless device access to a communication network (e.g., communication network 106). Access node 406 may schedule transmissions (e.g., physical resource block transmissions) to wireless devices in communication with the access node. For example, a packet may be received at access node 406 that is associated with wireless device 402, and access node 406 may schedule transmissions to wireless device 402 to communicate the data from the received packet.

In an embodiment, wireless devices may use device to device (D2D) communication in order to communicate data between the devices (e.g., without using the access node). For example, wireless devices 402 and 404 may comprise a D2D communication group such that the wireless devices communicate data. However, when wireless device 402 transmits data to wireless device 404, the received signal level at wireless device 404 may be low (e.g., below a threshold signal level) due to limited transmissions sources (e.g., lack of spatial multiplexing). Accordingly, a system that may increase the spatial multiplexing of a signal being transmitted during a device to device communication may be able to provide enhanced wireless services.

In an embodiment, the systems of FIGS. 2 and 4 may be implemented together. For example, access node 406 may be similar to access node 212, and wireless devices 402 and 404 may be similar to wireless devices 202, 204, 206, 208, and 210. In an embodiment, controller node 408, gateway node 410, and communication network 412 may be implemented with system 200.

Figure 5:
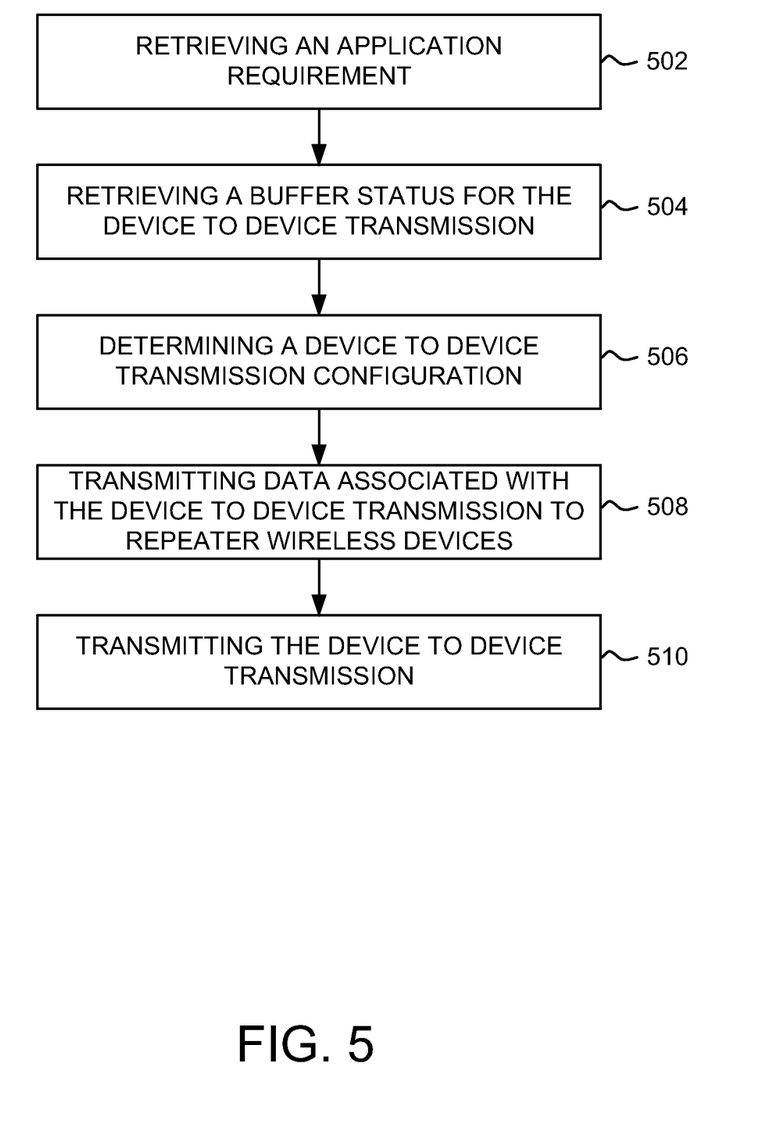
FIG. 5 illustrates another exemplary method for configuring device to device communication using a plurality of transmission devices.

FIG. 5 illustrates an exemplary method for configuring device to device communication. The method will be discussed with reference to the exemplary communication system 200 illustrated in FIG. 2, however, the method can be implemented with any suitable communication system.

Referring to FIG. 5, at step 502, application requirements may be retrieved for a recipient wireless device, at a source wireless device, wherein the source wireless device transmits data to the recipient wireless device using a device to device transmission. For example, wireless device 202 may transmit data to wireless device 204 as a device to device (D2D) communication. The application requirements for the transmission to wireless device 204 may be retrieved at wireless device 202.

In an embodiment, an application requirement, or a quality of service (QoS) requirement, may be one or more service conditions for a wireless transmission, such as a quality of service class identifier (QCI), a minimum guaranteed bit rate (GBR), maximum bit rate (MBR), a priority, a minimum bit rate, a maximum permitted data delay, a minimum throughput, a maximum error rate, a maximum data loss rate, and any other application requirement. In an embodiment, the communication between wireless devices 202 and 204 may comprise application requirements. For example, where a transmission from wireless device 202 to wireless device 204 comprises streaming video, the application requirements for wireless device 204 may comprise a minimum bit rate, a maximum permitted delay, a maximum error rate, and any other suitable application requirement.

At step 504, a buffer status may be retrieved for the device to device communication. For example, wireless device 202 may transmit data to wireless device 204 as a device to device (D2D) communication. The transmission may include buffered data at wireless device 202. The buffer status for the transmission to wireless device 204 may be retrieved at wireless device 202.

In an embodiment, the device to device communication between wireless device 202 and wireless device 204 may include a transmission of data from wireless device 202 to wireless device 204. The transmission may comprise a number of transmissions over a period of time, such as a video stream or any other suitable transmission. In this example, data to be transmitted to wireless device 204 from wireless device 202 may be buffered at wireless device 202 in a buffer (e.g., memory). A buffer size may comprise a data size for the buffered data. In an embodiment, the buffer status may comprise the buffer size at wireless device 202.

At step 506, a device to device transmission configuration based on the retrieved application requirement may be determined. For example, a configuration for the device to device communication from wireless device 202 to wireless device 204 may be determined. In an embodiment, the determined configuration may comprise a number of repeater wireless devices for the device to device communication.

In an embodiment, the device to device transmission configuration may be determined based on the retrieved application requirement and the retrieved buffer status. For example, a configuration for the device to device communication from wireless device 202 to wireless device 204 may be determined based on the retrieved application requirements for wireless device 204 and the buffer status (e.g., size for the buffered data) at wireless device 202.

In an embodiment, the determined configuration may comprise a number of repeater wireless devices for the device to device communication. For example, a number of repeater wireless devices may be determined based on the retrieved application requirements. In another example, a number of repeater wireless devices may be determined based on the retrieved application requirements and the retrieved buffer status. In an embodiment, the retrieved application requirements may be compared to an application requirement criteria such that a first number of repeater wireless devices is determined based on the comparison. The retrieved buffer status may be compared to a buffer status criteria such that a second number of repeater wireless devices is determined based on the comparison. In an embodiment, where the number of repeater wireless devices is based on the retrieved application requirements and the retrieved buffer status, the first number and second number may be combined. The combination may comprise one of summing the two numbers, multiplying the two numbers, or any other suitable combination.

In an embodiment, the number of repeater wireless devices may be directly proportional to the retrieved application requirements. A traffic priority may be determined for the retrieved application requirements, and the number of repeater wireless devices may be directly proportional to the traffic priority. For example, where the application requirements comprise a minimum data rate, the number of repeater wireless devices may be directly proportional to the minimum data rate. In an embodiment, the number of repeater wireless devices may be directly proportional to the retrieved buffer status. For example, the number of repeater wireless devices may be directly proportional to the retrieved buffer size.

In an embodiment, the determined configuration may comprise a modulation and coding scheme for the transmission from the source wireless device to the recipient wireless device. For example, the configuration may comprise a modulation and coding scheme for the transmission from wireless device 202 to wireless device 204. In an embodiment, a modulation and coding scheme may be determined based on the retrieved application requirements. In another example, a modulation and coding scheme may be determined based on the retrieved application requirements and the retrieved buffer status.

In an embodiment, the retrieved application requirements may be compared to an application requirement criteria such that a modulation and coding scheme is determined based on the comparison. In another example, the retrieved buffer status may be compared to a buffer status criteria such that a modulation and coding scheme is determined based on the comparison. In addition, a modulation and coding scheme may be determined based on both comparisons.

A modulation and coding scheme may comprise a modulation scheme (e.g., QPSK, 8QAM, 16QAM, 32QAM, 64QAM, and the like) and a coding bit rate. A bit rate may indicate a number of redundant bits in a transmission (e.g., number of redundant bits used for error correction at the receiver, and the like). Here, the combination of the modulation scheme and the bit rate may comprise a spectral efficiency for the transmission.

In an embodiment, the spectral efficiency of the determined modulation and coding scheme may be directly proportional to the retrieved application requirements. A traffic priority may be determined for the retrieved application requirements, and the spectral efficiency of the determined modulation and coding scheme may be directly proportional to the traffic priority. For example, where the application requirements comprise a minimum data rate, the spectral efficiency may be directly proportional to the minimum data rate. In an embodiment, the spectral efficiency of the determined modulation and coding scheme may be directly proportional to the retrieved buffer status. For example, the spectral efficiency may be directly proportional to the retrieved buffer size.

At step 508, data associated with the recipient wireless device may be transmitted to a number of wireless devices based on the determined configuration such that the number of wireless devices transmit the data to the recipient wireless device as device to device transmissions. For example, based on the configuration determined for the device to device communication, wireless device 202 may transmit data associated with wireless device 204 to a number of wireless devices.

The number of wireless devices may comprise wireless device 206, 208, and 210. In an embodiment, the repeater wireless devices may comprise wireless devices in an idle state. For example, wireless devices 206, 208, and 210 may not comprise an RRC connection with access node 212 while the wireless devices serve as repeater wireless devices for the device to device communication.

In an embodiment, the repeater wireless devices may be instructed to transmit the device to device communications using the determined modulation and coding scheme. For example, wireless devices 206, 208, and 210 may be instructed to transmit the device to device communication to wireless device 204 using the determined modulation and coding scheme.

At step 510, the data associated with the recipient wireless device may be transmitted from the source wireless device and the number of wireless devices to the recipient wireless device as a device to device communication. For example, wireless devices 202, 206, 208, and 210 may transmit the data associated with wireless device 202 to wireless device 204 in device to device communications.

In an embodiment, the source wireless device and the repeater wireless devices may transmit the device to device communications using the determined modulation and coding scheme. For example, wireless devices 202, 206, 208, and 210 may transmit the device to device communication to wireless device 204 using the determined modulation and coding scheme.

In an embodiment, the device to device transmissions may comprise an increased spatial multiplexing since wireless devices 206, 208, and 210 are additional signal sources for the transmission. For example, the device to device transmission by the number of wireless devices to the recipient wireless device may use spatial multiplexing such that the channel diversity of the device to device transmission is directly proportional to the number of wireless devices (e.g., number of repeater wireless devices). In an embodiment, the number of wireless devices that concurrently transmit the data to the recipient wireless device (e.g., the source wireless device and the repeater wireless devices) may comprise multipath components for the device to device transmission.

In an embodiment, wireless device 204 may receive the device to device transmission from wireless devices 202, 206, 208, and 210 at a received signal level (e.g., SINR level), such that the received signal level is greater than a received signal level for transmissions from wireless device 202 without the repeater wireless devices. In an example, the modulation and coding scheme used in the device to device transmissions that leverage the repeater wireless devices may also comprise an increased spectral efficiency when compared to a modulation and coding scheme used for transmissions from the source wireless device without the repeater wireless devices. The difference in the spectral efficiencies may be based on the increased received signal level at the recipient wireless device.

Although the methods described perform steps in a particular order for purposes of illustration, the methods discussed herein are not limited to any particular order or arrangement. One skilled in the art, using the disclosure provided herein, will appreciate that various steps of the methods can be omitted, rearranged, combined, and/or adapted in various ways.

Figure 6:
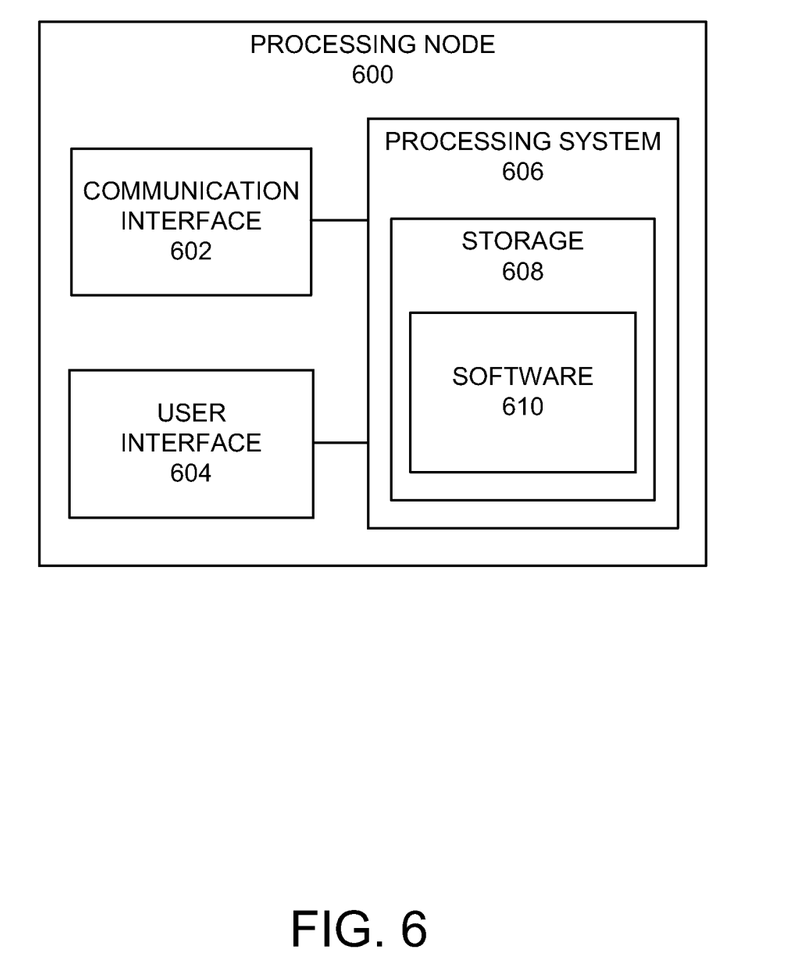
FIG. 6 illustrates an exemplary processing node.

FIG. 6 illustrates an exemplary processing node 600 in a communication system. Processing node 600 comprises communication interface 602, user interface 604, and processing system 606 in communication with communication interface 602 and user interface 604. Processing node 600 can be configured to determine a communication access node for a wireless device. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. Software 610 may include computer programs, firmware, or some other form of machine-readable instructions, including an operating system, utilities, drivers, network interfaces, applications, or some other type of software. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

Examples of processing node 600 include controller node 408 and gateway node 410. Processing node 600 can also be an adjunct or component of a network element, such as an element of access nodes 106 or 406 and the like. Processing node 600 can also be another network element in a communication system. Further, the functionality of processing node 600 can be distributed over two or more network elements of a communication system.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention, and that various modifications may be made to the configuration and methodology of the exemplary embodiments disclosed herein without departing from the scope of the present teachings. Those skilled in the art also will appreciate that various features disclosed with respect to one exemplary embodiment herein may be used in combination with other exemplary embodiments with appropriate modifications, even if such combinations are not explicitly disclosed herein. As a result, the invention is not limited to the specific embodiments described above, but only by the following claims and their equivalents.

What is claimed is:

1. A method for configuring a device to device communication using a plurality of transmission devices, the method comprising:
    retrieving, at a source wireless device in communication with an access node, an application requirement for a recipient wireless device, wherein the source wireless device transmits data to the recipient wireless device using a device to device transmission;
    determining a device to device transmission configuration based on the retrieved application requirement, wherein determining the configuration further comprises determining, based on the retrieved application requirements, a number of repeater wireless devices for a device to device transmission to the recipient wireless device, the number comprising a particular quantity of repeater wireless devices; and
    transmitting, to the number of repeater wireless devices, data associated with the recipient wireless device based on the determined configuration such that the number of repeater wireless devices transmit the data to the recipient wireless device as device to device transmissions.

2. The method of claim 1, further comprising retrieving a buffer status for the device to device transmission from the source wireless device to the recipient wireless device.

3. The method of claim 2, wherein determining the device to device transmission configuration comprises determining, based on the retrieved application requirement and the retrieved buffer status, the number of repeater wireless devices for a device to device transmission to the recipient wireless device.

4. The method of claim 3, wherein the determined number of repeater wireless devices is directly proportional to a traffic priority for the retrieved application requirement and directly proportional to the retrieved buffer status.

5. The method of claim 4, wherein
    the retrieved application requirement is compared to an application requirement criteria such that a first number of repeater wireless devices is determined and the retrieved buffer status is compared to a buffer status criteria such that a second number of repeater wireless devices is determined, and
    the first number of repeater wireless devices and the second number of repeater wireless devices are combined to determine the number of repeater wireless devices.

6. The method of claim 5, wherein combining the first number of repeater wireless devices and the second number of repeater wireless devices comprises at least one of summing the numbers and multiplying the numbers.

7. The method of claim 1, wherein the device to device transmission by the number of repeater wireless devices to the recipient wireless device uses spatial multiplexing such that the channel diversity of the device to device transmission is directly proportional to the number of repeater wireless devices.

8. The method of claim 1, further comprising transmitting, to the recipient wireless device, the data as a device to device transmission, wherein the number of repeater wireless devices concurrently transmit the data to the recipient wireless device such that the number of wireless devices comprise multipath components for the device to device transmission.

9. A system for configuring a device to device communication using a plurality of transmission devices, the system comprising:
    a source wireless device with a processor that is in communication with an access node, the source wireless device being configured to:
    retrieve, at the source wireless device, an application requirement for a recipient wireless device, wherein the source wireless device transmits data to the recipient wireless device using a device to device transmission;
    determine a device to device transmission configuration based on the retrieved application requirement, wherein determining the configuration further comprises determining, based on the retrieved application requirements, a number of repeater wireless devices for a device to device transmission to the recipient wireless device, the number comprising a particular quantity of repeater wireless devices; and
    transmit, to the number of repeater wireless devices, data associated with the recipient wireless device based on the determined configuration such that the number of repeater wireless devices transmit the data to the recipient wireless device as device to device transmissions.

10. The system of claim 9, wherein the source wireless device is further configured to:
    retrieve a buffer status for the device to device transmission from the source wireless device to the recipient wireless device.

11. The system of claim 10, wherein determining the device to device transmission configuration comprises determining, based on the retrieved application requirement and the retrieved buffer status, the number of repeater wireless devices for a device to device transmission to the recipient wireless device.

12. The system of claim 11, wherein the determined number of repeater wireless devices is directly proportional to a traffic priority for the retrieved application requirement and directly proportional to the retrieved buffer status.

13. The system of claim 12, wherein
    the retrieved application requirement is compared to an application requirement criteria such that a first number of repeater wireless devices is determined and the retrieved buffer status is compared to a buffer status criteria such that a second number of repeater wireless devices is determined, and the first number of repeater wireless devices and the second number of repeater wireless devices are combined to determine the number of repeater wireless devices.

14. The system of claim 13, wherein combining the first number of repeater wireless devices and the second number of repeater wireless devices comprises at least one of summing the numbers and multiplying the numbers.

\* \* \* \* \*